UNITED STATES PATENT OFFICE.

SAMUEL V. HARBAUGH, OF BALTIMORE, MARYLAND, ASSIGNOR TO JOHN W. BOWEN, OF SAME PLACE.

PROCESS OF MAKING SOAP POWDER.

SPECIFICATION forming part of Letters Patent No. 569,154, dated October 6, 1896.

Application filed February 25, 1896. Serial No. 580,734. (No specimens.)

*To all whom it may concern:*

Be it known that I, SAMUEL V. HARBAUGH, a citizen of the United States, residing at Baltimore, in the State of Maryland, have invented certain new and useful Improvements in the Manufacture of Soap Powder, of which the following is a specification.

This invention relates to improvements in soap-manufacture.

The object of the invention is to produce by a direct process of manufacture an article of soap in the form of dry powder.

Soap powders are now on the market, being put up in packages and sold in the stores; but so far as I am aware these powders are the product of ordinary "hard-soap" manufacture, which is solidified, dried, and then ground or otherwise reduced to a powder. The desideratum is a soap powder produced by a direct process of manufacture, *i. e.*, without previous solidification and subsequent reduction to powder.

In carrying my invention into effect what is known as the "cold process" is resorted to; but I make neither a hard soap nor a soft soap.

The ingredients entering into my soap powder are: animal fat or suitable oil, caustic soda, lime, and water. Silicate of sodium may be added, but this is not essential, and the steps or process by which the soap is manufactured are as follows:

Take two hundred and fifty pounds of clean animal fat or suitable oil, place it in a caldron, and apply heat sufficient to melt the fat, say 135° Fahrenheit. When melted, it is placed in a suitable vessel. A solution of twenty-four gallons caustic soda or its equivalent, 35° Baumé alkaline strength and 165° Fahrenheit temperature, is then poured quickly and in full volume over the said melted or warm grease, and then the mass is stirred gently for about five minutes. To this mass is then added forty-five gallons of a solution of lime of a density of 28° Baumé. Where it is desired to add silicate of sodium, about two hundred pounds of same is added to the mass at this stage. The lime to make the solution must be fresh slaked. These ingredients are then thoroughly incorporated by stirring, and are then allowed to stand one hour. The chemical reaction promptly ensues, and at the end of the time named, usually one hour, the mass is found in a granular condition much resembling in appearance cornmeal. There is an absence of any pasty or semifluid condition, and the mass does not solidify. The granular mass is then spread on tables or shelves to dry. It will become dry ordinarily in about forty-eight hours, more or less, depending on the condition of the atmosphere. When it is dry, it is subjected to sifting, and all lumps which will not pass through the sieve are then ground or crushed and again sifted.

The product resulting from this process is a dry powdered soap resembling in appearance white cornmeal. It may be put up in paper packages, bottles, or other convenient form for use.

Having thus described my invention, I claim—

The herein-described improvement in making soap powder in the form of dry powder having an appearance resembling cornmeal, consisting of first bringing the fat to a melted condition; pouring a solution of caustic soda quickly and in full volume over said melted fat or oil without stirring; then stirring gently for a few minutes; then adding a solution of lime and thoroughly incorporating all the ingredients by stirring; allowing the mass to stand until it assumes a granular or powdered condition; then spreading the mass out to dry; and finally passing the dried mass through a sieve.

In testimony whereof I affix my signature in the presence of two witnesses.

SAMUEL V. HARBAUGH.

Witnesses:
   MARGARET HARBAUGH,
   ETTA HARBAUGH.